United States Patent
Kishtaka et al.

[11] Patent Number: 6,084,643
[45] Date of Patent: *Jul. 4, 2000

[54] RECEIVING EQUIPMENT AND METHOD OF USING THE SAME

[75] Inventors: Yuriko Kishtaka, Saitama; Tetsuya Kohno, Kanagawa; Naoki Kigawa, Kanagawa; Toshiro Ozawa, Kanagawa; Mika Ito, Tokyo; Kazuhiro Akaike, Kanagawa, all of Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/897,976

[22] Filed: Jul. 21, 1997

[30] Foreign Application Priority Data

Jul. 24, 1996 [JP] Japan .................................. 8-213159

[51] Int. Cl.⁷ .................................................. H04N 5/44
[52] U.S. Cl. ........................... 348/725; 348/731; 348/553; 348/570
[58] Field of Search .................................. 348/7, 10, 12, 348/13, 710–1, 553, 563, 569, 570, 520, 725, 731, 732, 729, 733; H04N 5/44, 5/50

[56] References Cited

U.S. PATENT DOCUMENTS

| | | | |
|---|---|---|---|
| 4,279,035 | 7/1981 | Skerlos | 455/158.3 |
| 4,510,623 | 4/1985 | Bonneau et al. | 348/5.5 |
| 4,527,194 | 7/1985 | Siraz | 348/11 |
| 5,191,423 | 3/1993 | Yoshida | 348/731 |
| 5,416,508 | 5/1995 | Sakuma et al. | 348/3 |
| 5,550,576 | 8/1996 | Klosterman | 348/6 |
| 5,564,008 | 10/1996 | Saitoh | 455/186.1 |
| 5,564,088 | 10/1996 | Saitoh | 455/186.1 |
| 5,719,637 | 2/1998 | Ohkura et al. | 348/564 |
| 5,790,202 | 8/1998 | Kummer et al. | 348/553 |

*Primary Examiner*—John K. Peng
*Assistant Examiner*—Jean W. Désir
*Attorney, Agent, or Firm*—Jay H. Maioli

[57] ABSTRACT

A receiving method in the receiving equipment in, first, a service table composed of channel numbers currently on air is made and, if the channel key is judged to be pressed, a channel number searched from the service table is displayed on the screen. If the channel key is judged to be pressed continuously, only the channel numbers are changed and if the channel key is judged to be released, a channel selection is started. There is thus provideded a receiving equipment capable of swiftly selecting a desired channel of the television broadcasting.

8 Claims, 9 Drawing Sheets

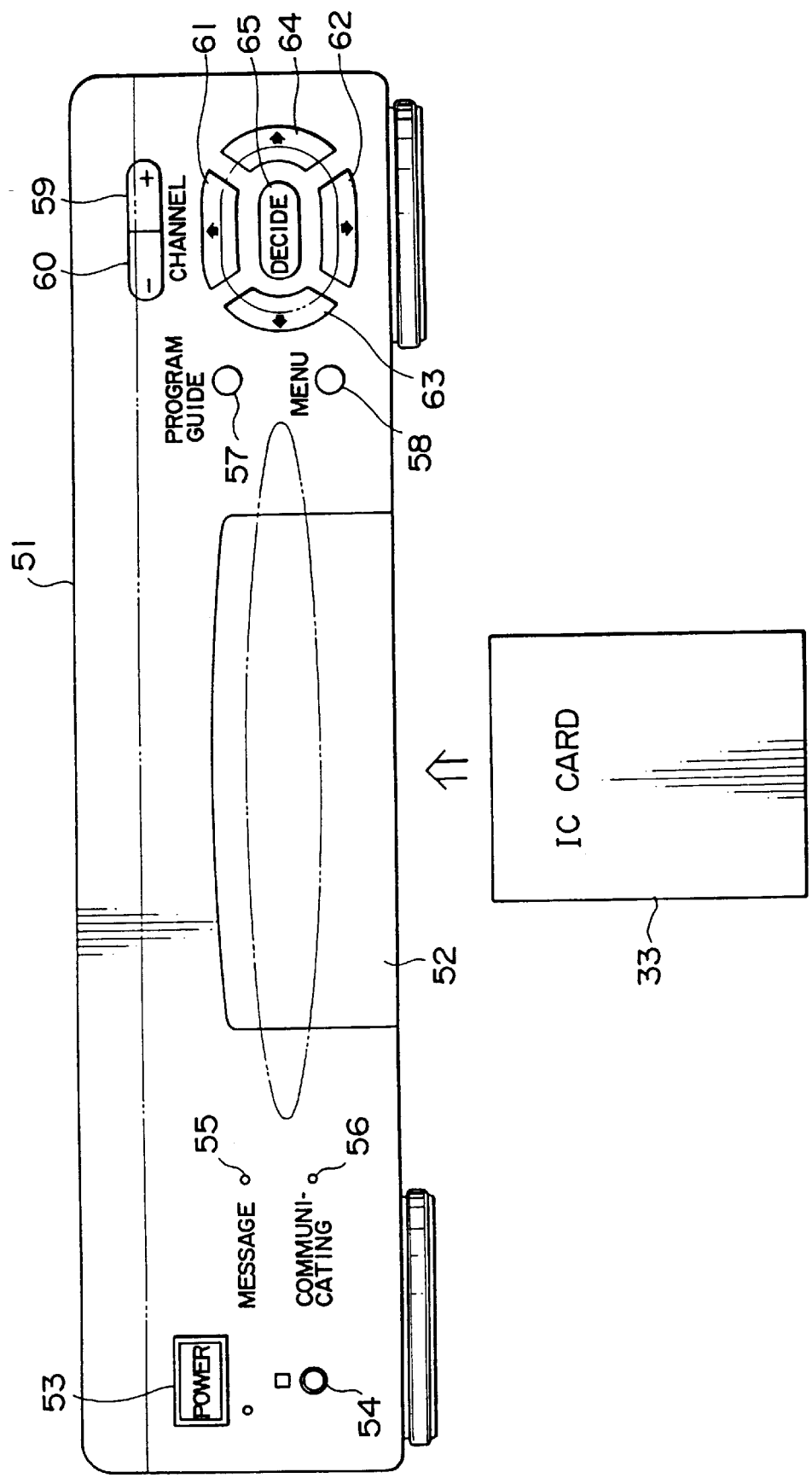

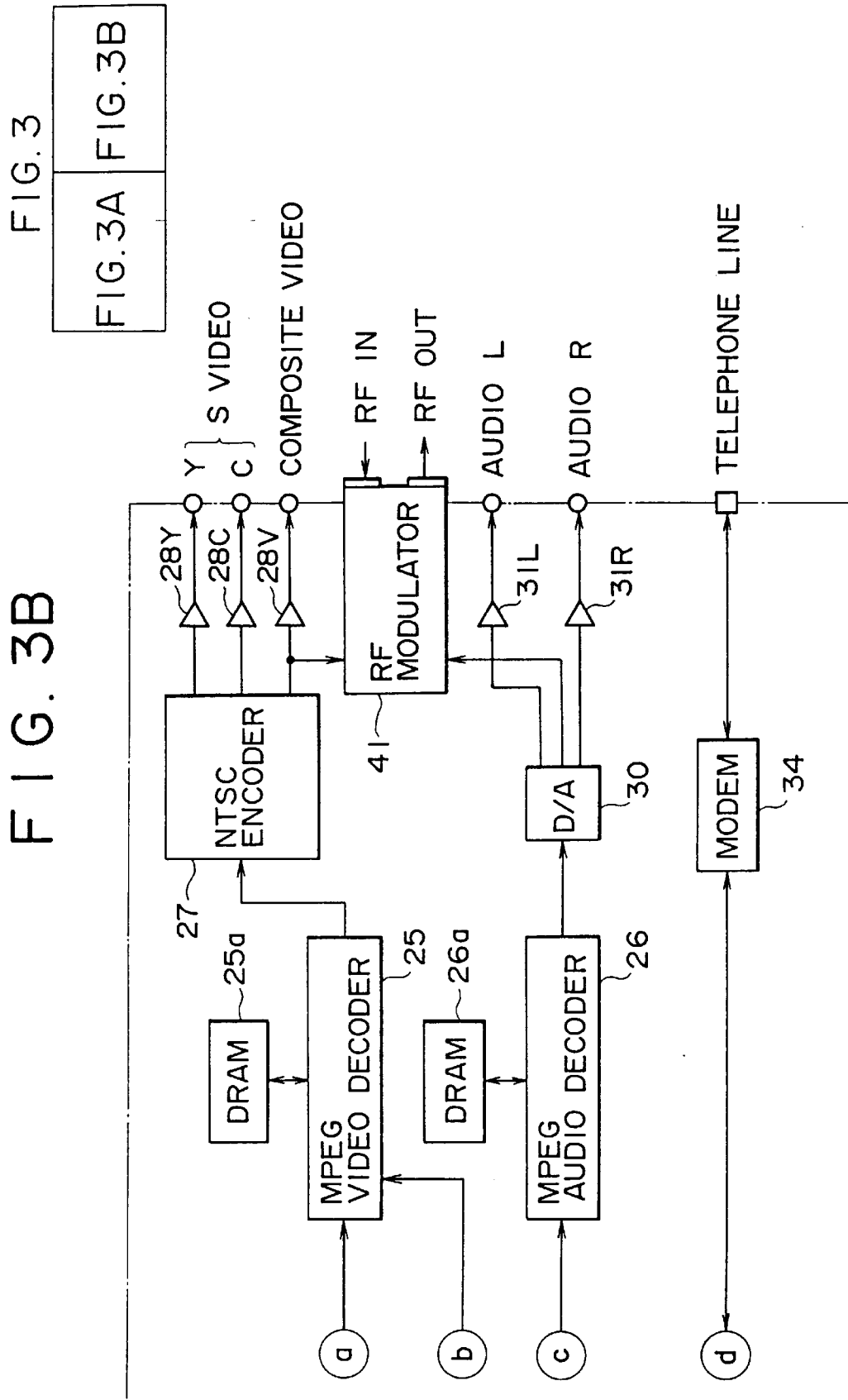

FIG. 5

```
network_information_section(){
    table_id                            8    uimsbf
    section_syntax_indicator            1    bslbf
    reserved                            3    bslbf
    section_length                     12    uimsbf
    network_id                         16    uimsbf
    reserved                            2    bslbf
    version_number                      5    uimsbf
    current_next_indicator              1    bslbf
    section_number                      8    uimsbf
    last_section_number                 8    uimsbf
    reserved                            4    bslbf
    network_descriptors_length         12    uimsbf
    for(i=0;i<N;i++){
        descriptor()
    }
    reserved                            4    bslbf
    transport_stream_loop_length       12    uimsbf
    for(i=0;i<N;i++){
        transport_stream_id            16    uimsbf
        original_network_id            16    uimsbf
        reserved                        4    bslbf
        transport_descriptors_length   12    uimsbf
        for(j=0;i<M;j++){
            descriptor()
        }
    }
    CRC_32                             32    rpchof
}
```

FIG. 6

```
service_list_descriptor(){
    descriptor_tag          8    uimsbf
    descriptor_length       8    uimsbf
    for(i=0;i<N;i++){
        service_id         16    uimsbf
        service_type        8    uimsbf
    }
}
```

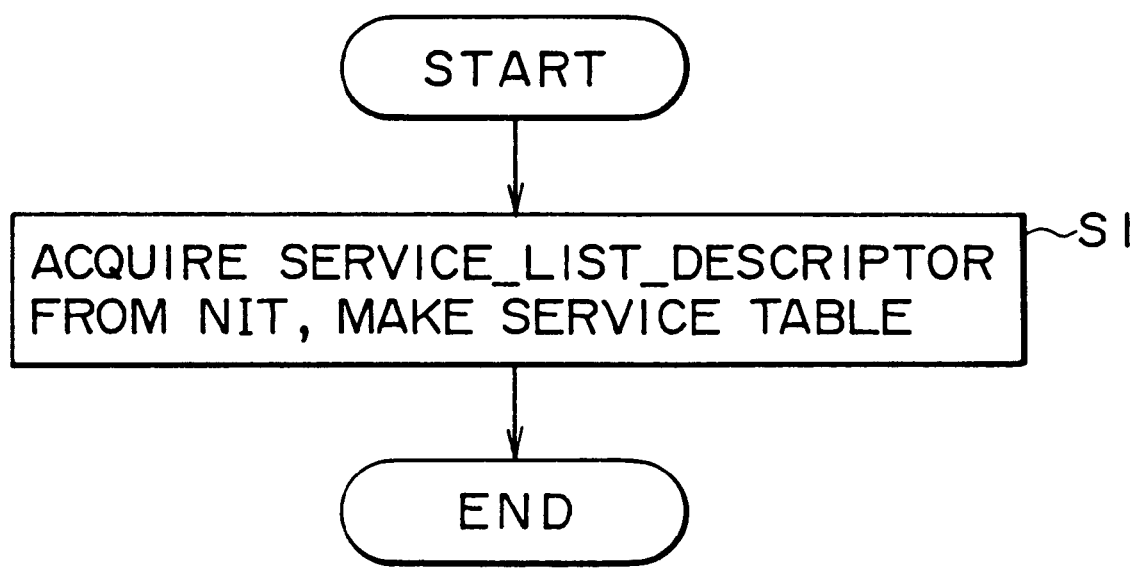

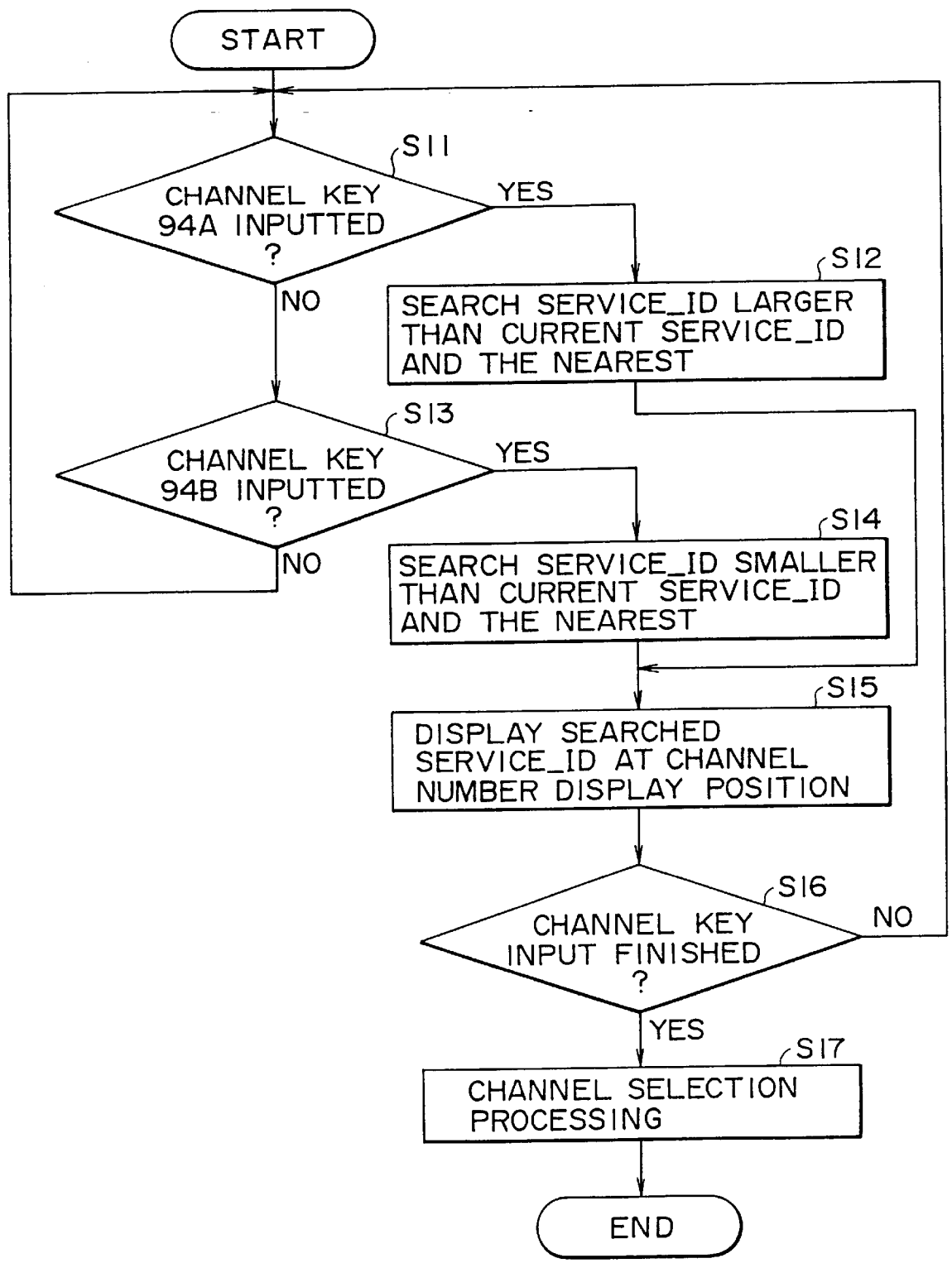

RECEIVING EQUIPMENT AND METHOD OF USING THE SAME

BACKGROUND OF THE INVENTION

1. Field of the Invention

The present invention relates to receiving equipment and a method of using the same, whereby a channel switching to a desired channel can be done swiftly.

2. Description of the Related Art

In the analog television broadcasting, to select a channel means to tune a reception frequency for receiving a signal transmitted through a broadcasting radio wave and the like to a frequency of a desired channel, namely, performing a tuning. Tuning the reception frequency to a carrier frequency of a desired channel will produce pictures and sounds of the channel almost instantaneously.

When switching channels in a sequential order by a plus/minus key, even continuing pressing the plus/minus key will select channels sequentially channel by channel, and produce pictures and sounds corresponding to the selected channel almost instantaneously. Thus, while confirming channel numbers and pictures and sounds of the channels, a desired channel can be selected.

In a digital television broadcasting using a satellite, it is conceivable of switching channels sequentially by the plus/minus key.

However, in the digital television broadcasting in which pictures and sounds are transmitted in a compressed format, the receiving side has to expand the compressed pictures and sounds. Therefore, when continuing pressing the plus/minus key, it takes, for example, two to three seconds until pictures and sounds broadcast by the switched channel and channel number display appear on the output. Therefore, it takes rather a long time to switch a channel by continuously pressing the plus/minus key.

SUMMARY OF THE INVENTION

The present invention has been made in view of the foregoing problems, and an object of the present invention is to provide a receiving equipment that can select a desired channel swiftly.

In order to accomplish the foregoing object, the receiving equipment according to the invention is provided with: a transmission signal receiving means for receiving transmission signals including a plurality of channels; a command receiving means for receiving a command; a channel number display control means that, in accordance with the command commanding to switch the channels received by the command receiving means in a predetermined order, switches channel numbers in the predetermined order; a display means for displaying the channel numbers switched by the channel number display control means and pictures based on the transmission signals received by the transmission signal receiving means; and a control means for controlling the transmission signal receiving means to receive the transmission signal of a channel indicated by the channel number displayed on the display means, when the command received by the command receiving means is broken.

In the foregoing construction, the channel number display control means may switch the channels in the magnitude order of the channel numbers.

Further, the channel number display control means may switch the channel numbers in a shorter time than a time required for a channel selection by the transmission signal receiving means.

Furthermore, the receiving equipment may further comprise a storage means for storing a plurality of the channel numbers, and the channel number display control means may switch the channel numbers displayed on the display means, on the basis of the channel numbers stored in the storage means.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

In the drawings:

FIG. 2 is a chart showing a front construction of the IRD 2 in FIG. 1;

FIG. 5 is a chart showing an example of the NIT configuration;

FIG. 6 is a chart showing a configuration example of the service_list_descriptor;

FIG. 7 is a flow chart when the power is on;

FIG. 8 is a flow chart for explaining a processing to select a channel using the channel up down key 94.

DESCRIPTION OF THE PREFERRED EMBODIMENT

Preferred embodiments of the present invention will hereafter be described in detail with reference to the accompanying drawings.

Figure 1:
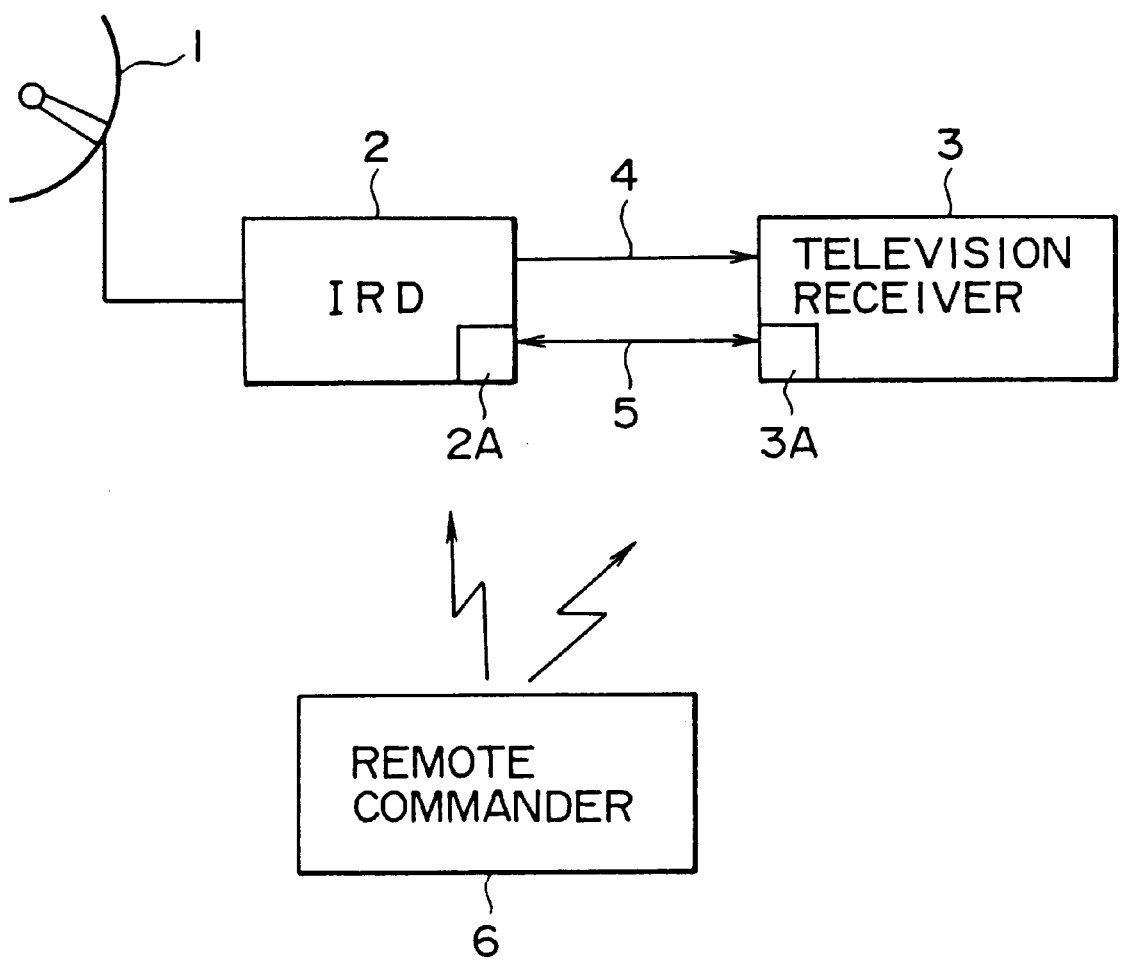
FIG. 1 is a block diagram showing a construction of an AV system to which the present invention is applied.

FIG. 1 illustrates a construction of an AV (Audio Visual) system to which the invention is applied. In this embodiment, the AV system is composed of a parabolic antenna 1 for receiving a radio wave transmitted from a transmitter not illustrated through a satellite (broadcasting satellite or communications satellite), an IRD (integrated receiver/Decoder) 2 for decoding signals received by the parabolic antenna 1, and a television receiver 3.

The IRD 2 (or television receiver 3) is designed to be able to receive a command by an infrared (IR) signal from a remote commander 6. Namely, operating a specific switch on the remote commander 6 transmits an IR signal corresponding to the switch through an IR signal transmitting unit 72 (FIG. 4), and the IR signal enters an IR signal receiving unit 54 (FIG. 2) of the IRD 2.

The IRD 2 feeds the output thereof to the television receiver 3 through an AV line 4 composed of, for example, three lines of a composite video signal line, audio L signal line, and audio R signal line. Further, the IRD 2 has an AV equipment control signal transmitting and receiving unit 2A, and the television receiver 3 has an AV equipment control signal transmitting and receiving unit 3A. These are interconnected by a control line 5 based on the wired SIRCS (Wired Sony Infrared Remote Control System) (trade mark).

FIG. 2 shows a front construction of the IRD 2. A lid 52 is attached on the center of a body 51 so as to be freely opened and closed, inside of which an IC card 33 is designed to be inserted. A power supply key 53 is provided on the left side of the IRD 2. This power supply key 53 is operated when connecting or disconnecting the power. Under the power supply key 53, the IR signal receiving unit 54 is provided to receive the IR signal from the remote commander 6.

An LED 55 is made to light when this IRD 2 receives a message transmitted through a satellite. When a user confirms that this message is displayed on the television receiver 3, the LED 55 is put out. An LED 56 placed under the LED 55 lights while the IRD 2 communicates through a telephone line.

A program guide key 57 or a menu key 58 is operated when displaying an electronic program guide or a menu, respectively, on the television receiver 3.

An up key 61, down key 62, left key 63, and right key 64 are disposed so as to surround a decision key 65 from above and under below, right and left in an annular form. The up key 61, down key 62, left key 63, and right key 64 (hereunder, these keys are mentioned also as a direction key as appropriate) are operated when shifting a cursor up and down, left and right. The decision key 65 is operated when determining a selection. A channel up key 59 and channel down key 60 are operated when increasing or decreasing a receiving channel number.

Figure 3A:
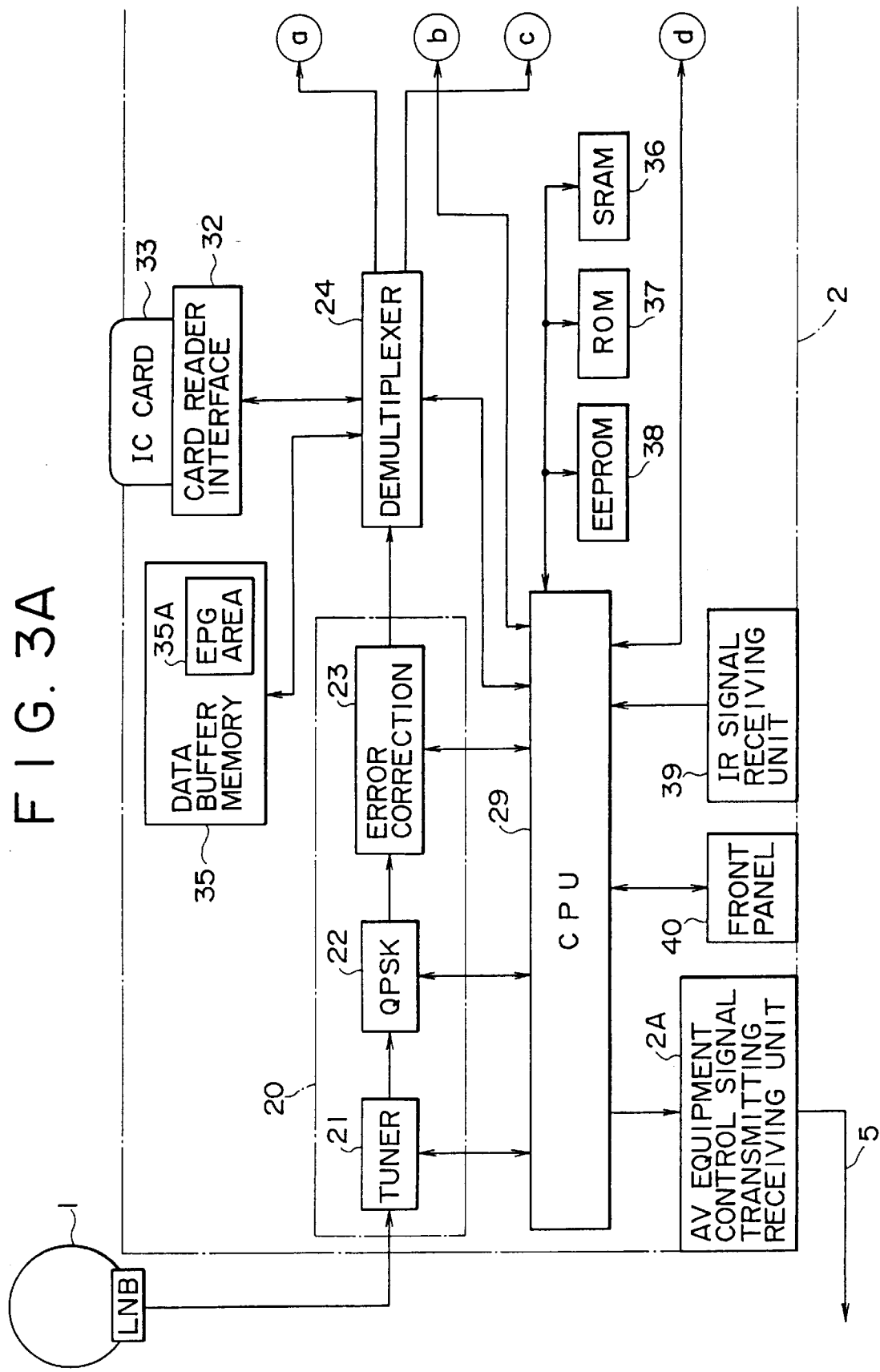
FIG. 3 is a block diagram showing an inner construction of the IRD 2 in FIG. 1.

FIG. 3 shows an inner construction of the IRD 2. An RF signal fed out from an LNB (Low Noise Block downconverter) 1a of the parabolic antenna 1 enters a tuner 21 of a front end 20 to be demodulated. The output of the tuner 21 is fed to a QPSK demodulator circuit 22, where the QPSK signal is demodulated. The output of the QPSK demodulator circuit 22 is fed to an error correction circuit 23, where errors are detected and corrected.

In the IC card 33 composed of a CPU, ROM, and RAM, etc., is stored a key necessary for decoding a cipher as well as a deciphering program. When signals transmitted through a satellite are enciphered, decoding the cipher requires the deciphering processing applying the key. Accordingly, through a card reader interface 32, this key is read out from the IC card 33, and is supplied to a demultiplexer 24. The demultiplexer 24 decodes enciphered signals using this key.

Further, in this IC card 33, accounting data and the like are stored in addition to a key necessary for decoding a cipher and a deciphering program.

The demultiplexer 24 receives signals sent out from the error correction circuit 23 of the front end 20, and makes a data buffer memory DRAM (Dynamic Random Access Memory) or SRAM (Static Random Access Memory)) 35 temporarily store the received signals. Reading out the stored signals as needed, the demultiplexer 24 supplies decoded video signals to a MPEG video decoder 25, and decoded audio signals to a MPEG audio decoder 26.

The MPEG video decoder 25 makes a DRAM 25a store input digital video signals, and decodes video signals compressed according to the MPEG format. The decoded video signals enter an NTSC encoder 27, and are converted into an NTSC luminance signal (Y), chroma signal (C), and composite video signal (V). The luminance signal (Y) and chroma signal (C) are outputted as S video signals through buffer amplifiers 28Y and 28C, respectively. And, the composite signal is outputted from a buffer amplifier 28V through the AV line 4.

Incidentally, An MPEG 2 decoding LSI (STi3500) from SSG-Thomson Microelectronics Inc. can be used for this MPEG video decoder 25. The outline of the LSI is presented, for example, by Mr. Martin Bolton on the "Nikkei Electronics" (p. 101 through p. 110), Mar. 14, 1994 (no. 603), issued by Nikkei BP Inc.

Further, the MPEG 2—Transport stream is described on the "latest MPEG textbook" (p. 231 through p. 253), issued on Aug. 1, 1994 by ASCII Inc.

The MPEG audio decoder 26 makes a DRAM 26a store digital audio signals supplied by the demultiplexer 24, and decodes audio signals compressed according to the MPEG format.

The decoded audio signals are converted by a D/A converter 30 into analog signals, and left channel audio signals are outputted from a buffer amplifier 31L through the AV line 4, and right channel audio signals are outputted from a buffer amplifier 31R through the AV line 4.

An RF modulator 41 converts the composite video signal supplied by the NTSC encoder 27 and the audio signal supplied by the D/A converter 30 into the RF signal to be sent out. Further, when the TV mode is set, this modulator 41 sends out the RF signal of the NTSC format coming in from AV equipment such as a cable box, as it is, to a VCR (Video Cassette Recoder) or other AV equipment (both of them, not illustrated).

In this embodiment, these video signals and audio signals are supplied to the television receiver 3 through the AV line 4.

A CPU (Central Processing Unit) 29 executes various processings in accordance with a program stored in a ROM 37. The CPU 29 controls, for example, the tuner 21, QPSK demodulator circuit 22, and error correction circuit 23 and the like. Further, the CPU 29 controls an AV equipment control signal transmitting receiving unit 2A, which supplies a control signal through a control line 5 to other AV equipment (television receiver 3, in this embodiment) and receives a control signal from the other AV equipment.

To this CPU 29, commands can directly be inputted by operating various keys on a front panel 40 (FIG. 2). Operating the remote commander 6 (FIG. 4) will transmits an IR signal from an IR signal transmitting unit 72, the IR signal is received by an IR signal receiving unit 39, and the received result is supplied to the CPU 29. Therefore, operating the remote commander 6 can also input commands to the CPU 29.

Further, the demultiplexer 24 takes in an EPG (Electrical Program Guide) data other than the MPEG video data and audio data supplied from the front end 20, and supplies the EPG data to an EPG area 35A of the data buffer memory 35 to be stored therein. The EPG data includes information relating to programs of the broadcasting channels (for example, channel, air time, title, category, etc., other than typical still pictures of the programs from the present time till 24 hours later (in case of EPG 2 and EPG 1–2) or till 150 hours later (in case of EPG 2, EPG 3, EPG 1–2, and EPG 1–3). The EPG data are frequently transmitted, and the EPG area 35A can always hold the latest EPG data.

In an EEPROM (Electrically Erasable Programmable Read Only Memory) 38 are stored data that are desired to be maintained after the power is turned off (for example, reception history of the tuner 21 for four weeks, channel number having been received directly before any operation is done by a user (last channel)). The data stored in the EEPROM 38 are utilized, for example, in such a process that the power is on and the same channel as the last channel is automatically received again. When the last channel is not stored, a channel stored in the ROM 37 as a default is received.

Further, when the sleep mode is set, and even when the power is off, the CPU 29 activates circuits necessary for a minimum operation such as the front end 20, demultiplexer 24, data buffer memory 35, etc., clocks the present time based on the time information contained in the reception signal, and controls the circuits to execute specific operations at specific times. The CPU controls, for example, to execute a timer automatic recording working with an external VCR (Video Cassette Recorder).

Further, the CPU 29 controls the MPEG video decoder 25, when an OSD (On-Screen Display) data is desired to be generated. The MPEG video decoder 25 generates an OSD data in accordance with the control by the CPU 29, writes the OSD data in the DRAM 25a, and reads out the data to send out. Thereby, specific characters, graphics, pictures (for example, characters, symbols, icons, and screens that are superimposed on usual picture images) can appropriately be sent out to the television receiver 30 to be displayed.

An SRAM 36 is employed as a work memory for the CPU 29. A modem 34 transfers data through telephone lines under the control of the CPU 29.

Figure 4:
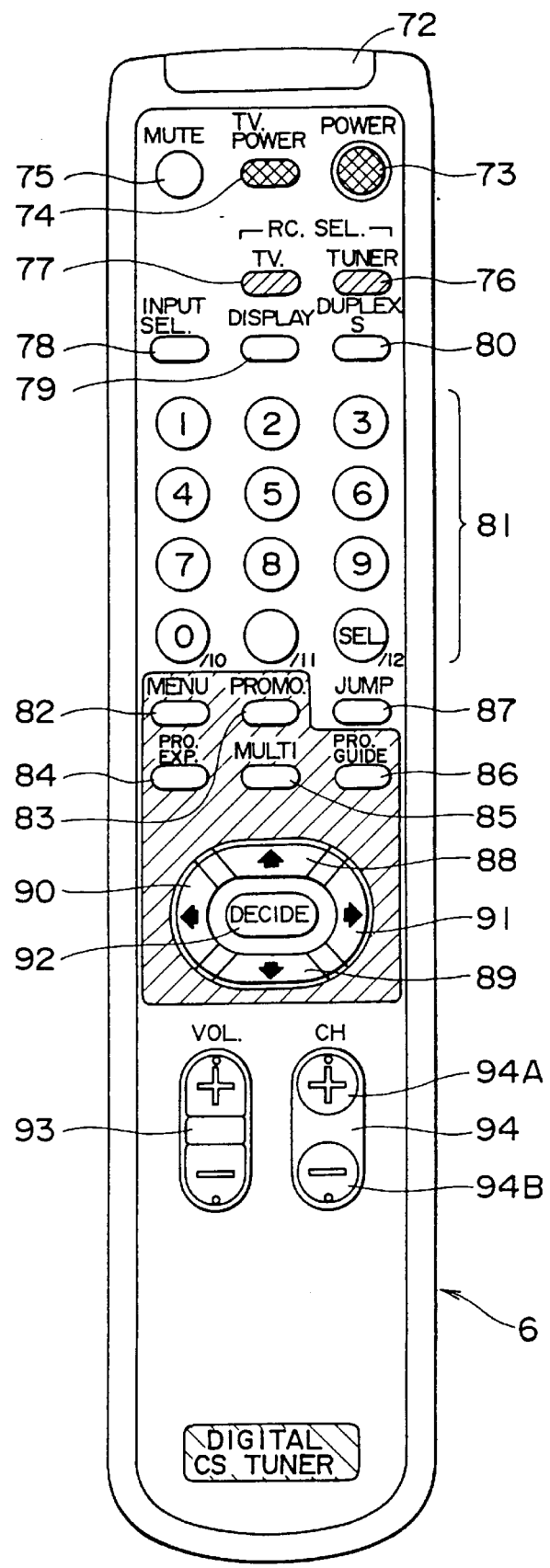
FIG. 4 is a chart showing a construction of the remote commander 6 in FIG. 1.

FIG. 4 illustrates a construction of the remote commander 6. On top of the commander, the IR signal transmitting unit 72 is provided which generates the IR signals corresponding to various key operations. A power supply key 73 is operated when connecting or disconnecting the power supply of the IRD 2, and a TV power supply key 74 is operated when connecting or disconnecting the power supply of the television receiver 3. A mute key 75 is operated when muting an audio signal level, or when releasing the muted state. A switch key 76 is operated when remotely controlling the IRD 2 by this remote commander 6, and a switch key 77 is operated when remotely controlling the television receiver 3 by this remote commander 6.

An input switch key 78 is operated when switching an input to the IRD 2 or the television receiver 3. A screen display key 79 is operated when switching on and off displays of characters and the like relating to the electronic program guide. A duplex sound key 80 is operated, when plural sound channels are present, to switch the sound channels.

Ten keys 81 are operated when inputting a number from 0 through 9. Further, a number "0" key and a "station call" key are operated when inputting the number 10 or 12, and a key disposed between the both keys is operated when inputting the number 11.

A menu key 82 is operated when displaying a menu, and a promotion key 83 is operated when displaying a promotion channel. A program explanation key 84 is operated when displaying a program explanation information of the electronic program guide. A multi key 85 is operated when displaying reduced screens of the broadcasting channels on one screen, for example, as a 4×4 multi screens, as the electronic program guide. A program guide key 86 is operated when displaying the electronic program guide. A jump key 87 is operated when moving to the last channel.

An up key 88, down key 89, left key 90, and right key 91 (hereunder, these keys are appropriately called also as direction keys) are operated when shifting the cursor up and down, left and right, respectively. A decision key 92 placed in the center of these keys is operated when inputting a decision of a selection. A channel up down key 94 is operated when incrementing or decrementing the receiving channel number one by one. These up key 88, down key 89, left key 90, right key 91, and decision key 92 are correspond to the up key 61, down key 62, left key 63, right key 64, and decision key 65 that are provided on the body of the IRD 2 shown in FIG. 2, and the layout is made correspondingly. Further, the channel up down key 94 corresponds to the channel up key 59 and the channel down key 60 in FIG. 2.

A volume up down key 93 is operated when increasing or decreasing the volume gradually with a constant volume level.

Next, the basic operation will be described. When a user operates, for example, the ten keys 81 of the remote commander 6 to input an optional channel number, the IR signal corresponding to the inputted channel number is transmitted from the IR signal transmitting unit 72. This IR signal is received by the IR signal receiving unit 39 of the IRD 2. The CPU 29 controls the tuner 21 to receive the channel corresponding to the inputted channel number, when receiving a signal supply corresponding to the IR signal from the IR signal receiving unit 39.

Receiving signals supplied by the LNB 1a, the tuner 21 demodulates a signal corresponding to a channel number instructed by the CPU 29 to send out to the QPSK demodulator circuit 22. The demodulated signal by the QPSK demodulator circuit 22 enters the error correction circuit 23, which applies the error correction to the signal, and thereafter the signal enters the demultiplexer 24. In the demultiplexer 24, input signals are split into video data and audio data, and the video data are supplied to the MPEG video decoder 25 and the audio data are supplied to the MPEG audio decoder 26. The MPEG video decoder 25 decodes the input video data in accordance with the MPEG format to sendout to the NTSC encoder 27. The NTSC encoder 27 converts the input video data into a video signal of the NTSC format. This video signal is supplied through, for example, the buffer amplifier 28V, to the television receiver 3 as the composite video signal through the AV line 4.

Further, the MPEG audio decoder 26 decodes the input audio data in accordance with the MPEG format to send out to the D/A converter 30. The D/A converter 30 converts the input audio data into the left and right analog audio signals to output through the buffer amplifiers 31L, 31R. These audio signals are also supplied to the television receiver 3 through the AV line 4. In this manner, pictures and sounds of a program that a user commands by operating the remote commander 6 are supplied to the television receiver 3.

Further, when detecting the EPG data from received signals, the demultiplexer 24 supplies the EPG data to the data buffer memory 35 to store the EPG data in the EPG area 35A.

When a key of the remote commander 6 is operated and the EPG data are commanded to be read out, the CPU 29 reads out the EPG data stored in the EPG area 35A and makes the MPEG video decoder 25 convert the EPG data into the OSD data. The OSD data enters the NTSC encoder 27, where the data are superimposed on usual program pictures to be sent out.

In the digital satellite broadcasting, an NIT (Network Information Table) is transmitted, in addition to the data corresponding to the program itself. FIG. 5 illustrates an example of the NIT configuration. The version_number shows the version of this NIT, for example, the version number increases one by one at each time when the content is updated. In the NIT, an optional descriptor ( ) can be described.

FIG. 6 illustrates an example of the service_list_ descriptor of the descriptor ( ). Data showing that the descriptor is the service_list_descriptor are described in the descriptor_tag. The service_id corresponds to the channel number, and the service_type shows the type of a program of the channel. Therefore, the service_type is described in correspondence to, for example, television, radio, mosaic promotion, promotion, or data.

Next, referring to the flow charts in FIG. 7 and 8, a method for selecting a desired channel will be described.

First, when the power is turned on, the CPU 29 executes the flow shown in FIG. 7. Namely, at step S1, the service_list_descriptor is acquired from the NIT by the CPU 29, and a service table is made. In the digital satellite broadcasting, the foregoing data called as the NIT are transmitted, for example, at every 0.1 seconds. The CPU 29 acquires the service_list_descriptor of the NIT for each of the transponders, and lists up to make a service table. In the service table, the service_id (channel number) is described in the order of transmission. Therefore, the service_id is not necessarily described in the order of the magnitude thereof. This service table is supplied, for example, to the EEPROM 38 and is stored therein.

The service table is designed to be updated at each time when, for example, the version_number of the NIT is modified. Thereby, it is possible that only the channel numbers of channels being practically on air are to be described.

Next, when the channel key 94 is operated, the CPU 29 executes the flow shown in FIG. 8. First, at step S11, the CPU 29 judges whether or not the "+" area of the channel up down key 94 (hereunder, mentioned as channel key 94 A, as appropriate) is pressed. When the channel key 94 A is judged to be pressed, the step goes to step S12, and the CPU 29 searches the service_id that is larger than the currently selected service_id and the most nearest from the service table stored in the EEPROM 38.

On the other hand, when the channel key 94 A is judged not to be pressed at step S13, the step goes to step S4, and the CPU 29 judges whether or not the "−" area of the channel up down key 94 (hereunder, mentioned as channel key 94 B, as appropriate) is pressed. When the channel key 94 B is judged to be pressed, the step goes to step S14, and the CPU 29 searches the service_id that is smaller than the currently selected service_id and the most nearest from the service table stored in the EEPROM 38.

When the channel key 94 B is judged not to be pressed at step S13, the step returns to step S11, and the processings after step S11 are repeated.

When finishing either the processing at step S12 or the processing at step S14, the step goes to step S15 and the CPU 29 commands the MPEG video decoder 25 to generate an OSD data corresponding to the searched service_id and to display. The MPEG video decoder 25, according to the command by the CPU 29, generates the OSD data corresponding to the searched service_id, writes it in the OSD area in the DRAM 25a, and further reads out the OSD data to output. Thereby, the service_id (channel number) is displayed at a specific position on the screen of the television receiver 3.

Next, at step S16, the CPU 29 judges whether or not the channel up down key 94 finishes the operation. Namely, the CPU 29 judges whether or not a user's finger having been pressed the channel up down key 94 is detached therefrom and the operation is finished. If the channel up down key 94 is continued to be pressed and the operation is judged not to be finished, the step returns to step S11 and the processings after step S11 are repeated. This processing can be done quickly. In this embodiment, the processing from step S11 through S16 can be finished in 200 msec to 800 msec. In other words, the processing time is shorter than a time required for the channel selection. Thereby, only the channel number displayed on the screen is changed rapidly.

On the other hand, at step S16, if a user's finger having been pressed the channel up down key 94 is detached therefrom and the operation is judged to be finished, the step goes to step S17 to execute the channel selection processing. In this channel selection processing, the confirmation of the CA (Conditional Access) condition and the decoding of the MPEG data are executed.

To select a digital satellite broadcasting channel requires to satisfy the conditions of the CA; and therefore, for confirming the conditions, the CPU 29 controls to read out data recorded in the IC card 33 issued at the time of contract, and judges whether or not the conditions are satisfied. The decoding of the MPEG data is the same as the case that a channel number is directly inputted by operating the ten keys 81 of the remote commander 6, and the description will be omitted.

Thus, when operating the channel up down key 94 continuously, the channel number is quickly changed, and the channel selection does not start until an operation of the channel up down key 94 finishes. Therefore, a user can recognize that a key operation is reliably received. Further, a channel display is quickly changed, and the user will have an easy feeling of operation.

Further, when changing the channel number, the service table is searched and only the channel numbers present therein are displayed; and therefore, it cannot possibly occur that a channel currently not on air is selected and a message saying, for example, "corresponding channel is not present" is displayed on the screen.

As a method of making the service table, as described above, there are a method of describing the received service_id on the service table in the order that the transmitter side transmits and a method whereby the received service_id is sorted in the order of the service_id and then described on the service table in the sorted order.

Figure 9:
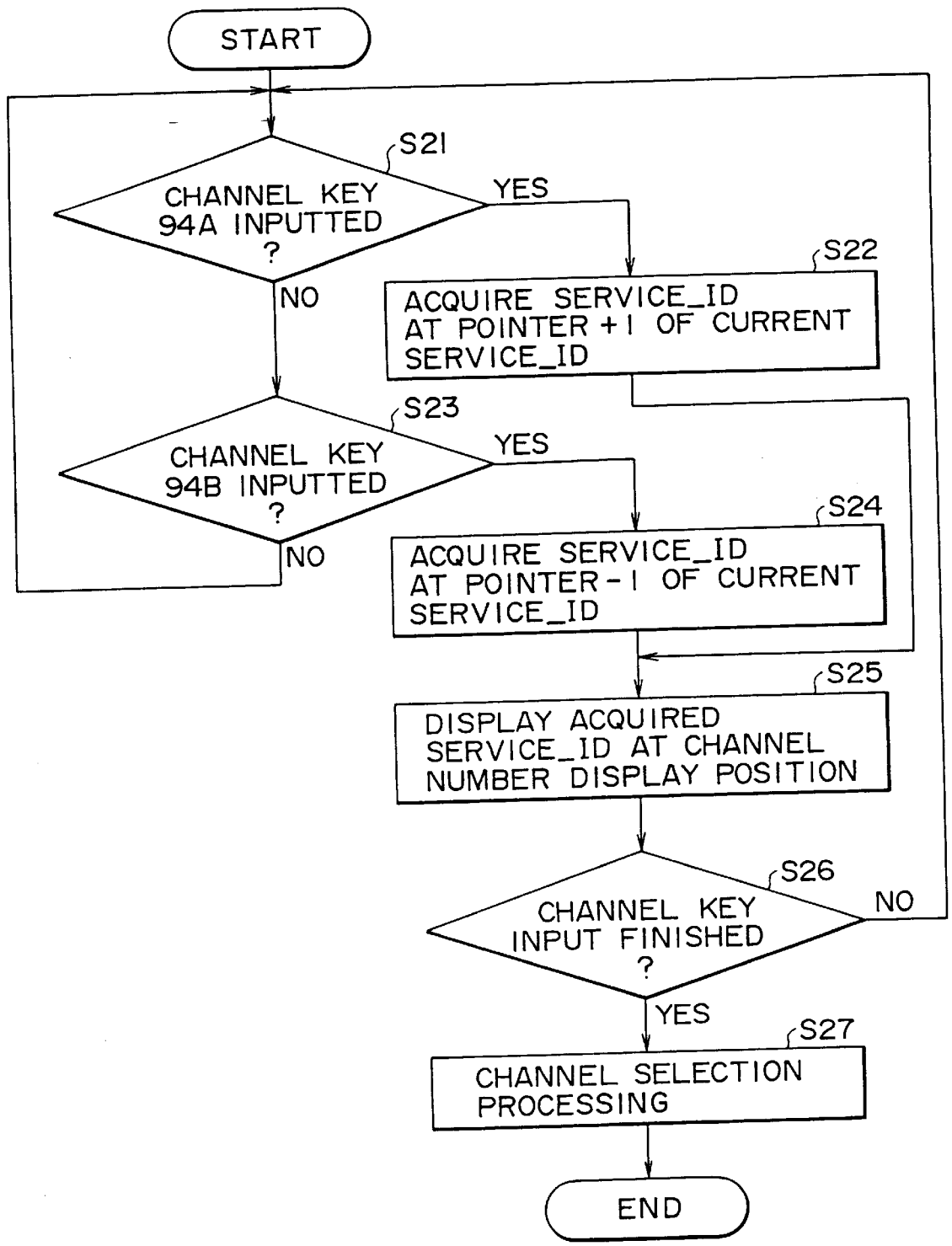
FIG. 9 is a flow chart for explaining another processing to select a channel using the channel up down key 94.

Next, with reference to FIG. 9, a method will be described whereby, when the received service_ids are sorted in the order of the magnitude of the service_id and then described on the service table, the channel up down key 94 is operated to switch channels and select a desired channel.

First, at step S21, the CPU 29 judges whether or not the "+" area of the channel up down key 94 (channel key 94 A) is pressed. If the channel key 94 A is judged to be pressed, the step goes to step S22 and the CPU 29 increments by one a pointer indicating a storage area where the currently selected service_id is stored, out of the service table stored in the EEPROM 38. The CPU 29 acquires the service_id stored in the area indicated by the pointer incremented by one.

As described above, the service_ids are stored in the order of the magnitude thereof, and incrementing the pointer by one and acquiring the service_id in the area indicated by the pointer can acquire a second larger service_id.

On the other hand, when the channel key 94 A is judged not to be pressed at step S21, the step goes to step S23. Step S23 judges whether or not the "−" area of the channel up down key 94 (channel key 94 B) is pressed. If the channel key 94 B is judged to be pressed, the step goes to step S24, and the CPU 29 decrements by one a pointer indicating a storage area where the currently selected service_id is stored, out of the service table stored in the EEPROM 38. The CPU 29 acquires the service_id stored in the area indicated by the pointer decremented by one.

At step S23, if the channel key 94 B is judged not to be pressed, the step returns to step S21 and the processings after step S21 are repeated.

When either the processing at step S22 or the processing at step S24 finishes, the step goes to step S25, and the CPU 29 commands the MPEG video decoder 25 to generate the OSD data corresponding to the acquired service_id and to display. The MPEG video decoder 25, according to the command by the CPU 29, generates the OSD data corresponding to the acquired service_id, writes it in the OSD area in the DRAM 25a, and further reads out the OSD data to output. Thereby, the service_id (channel number) is displayed at a specific position on the screen of the television receiver 3.

Next, at step S26, the CPU 29 judges whether or not the channel up down key 94 finishes the operation. Namely, the CPU 29 judges whether or not a user's finger having been pressed the channel up down key 94 is detached therefrom and the operation is finished. If the channel up down key 94 is continued to be pressed and the operation is judged not to be finished, the step returns to step S21 and the processings after step S21 are repeated. Thereby, only the channel number displayed on the screen is changed rapidly.

On the other hand, at step S26, if a user's finger having been pressed the channel up down key 94 is detached therefrom and the operation is judged to be finished, the step goes to step S27 to start the channel selection processing. This channel selection processing is the same as that in step S17 in FIG. 8, and the description will be omitted.

Thus, when operating the channel up down key 94 continuously, the channel number displayed on a screen is quickly changed, and the selection of a channel corresponding to the channel number displayed on the screen does not start until an operation of the channel up down key 94 finishes. Therefore, a user can recognize that a channel display is quickly changed and a key operation is reliably received, and the user will have an easy feeling of operation.

Further, when changing the channel number, the service_ids stored in the service table is acquired and the acquired service_ids are displayed; and therefore, it cannot possibly occur that a service_id not described in the service_list_descriptor from the NIT is selected. Thereby, it is possible to prevent that a message saying, for example, "corresponding channel is not present" is displayed on the screen.

Further, sorting the service_ids in the service table in the order of the magnitude thereof in advance will spare the need to sequentially search a next channel number in the service table, which enables the display of the channel numbers to change still more quickly.

Thereby, it is possible to perform easily and quickly the selection of the digital satellite broadcasting channels of some hundreds of channels.

According to the present invention, in case a command for continuously switching channels is given, the selection of a channel corresponding to the displayed channel number is designed to start when the command is finished; and therefore, it is possible to switch only the display of the channel number in a high speed and to select a desired channel swiftly.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A receiving equipment comprising:

transmission signal receiving means for receiving transmission signals including a plurality of channels;

command receiving means for receiving a command from a channel selection key operated by a user;

channel number display control means operative in accordance with the command received by the command receiving means commanding to switch the channels in a predetermined order for switching channel numbers being displayed in the predetermined order;

control means for controlling the transmission signal receiving means to receive the transmission signal of a channel indicated by the channel number being displayed when the command received by the command receiving means is broken, wherein the channel numbers being switched are displayed without displaying a channel selection until operation of the channel selection key is discontinued by the user; and storage means for storing a plurality of the channel numbers representing channels of transmission signals actually received, wherein the channel number display control means switches the channel numbers being displayed based on the channel numbers stored in the storage means.

2. The receiving equipment as claimed in claim 1, wherein the channel number display control means switches the channels in the order of magnitude of the channel numbers.

3. The receiving equipment as claimed in claim 1, wherein the channel number display control means switches the channel number in a shorter time than a time required for the channel selection by the transmission signal receiving means.

4. The receiving equipment as claimed in claim 1, wherein the transmission signals of the channels are each compressed digital signals.

5. An apparatus comprising:

transmission signal receiving means for receiving transmission signals including a plurality of channels;

command receiving means for receiving a command from a channel selection key operated by a user;

channel number display control means operative in accordance with the command received by the command receiving means commanding to switch the channels in a predetermined order for switching channel numbers in the predetermined order;

television receiver means for displaying the channel numbers switched by the channel number display control means and pictures based on the transmission signals received by the transmission signal receiving means;

control means for controlling the transmission signal receiving means to receive the transmission signal of a channel indicated by the channel number displayed on the television receiver means, when the command received by the command receiving means is broken, wherein the channel numbers being switched are displayed without displaying a channel selection until operation of the channel selection key is discontinued by the user; and storage means for storing a plurality of the channel numbers representing channels of transmission signals actually received, wherein the channel number display control means switches the channel numbers being displayed based on the channel numbers stored in the storage means.

6. The apparatus as claimed in claim 5, wherein the channel number display control means switches the channels in the order of magnitude of the channel numbers.

7. The apparatus as claimed in claim 5, wherein the channel number display control means switches the channel numbers in a shorter time than a time required for the channel selection by the transmission signal receiving means.

8. The apparatus as claimed in claim 6, wherein the transmission signals of the channels are each compressed digital signals.

* * * * *